United States Patent
Thubert et al.

(10) Patent No.: US 10,785,809 B1
(45) Date of Patent: Sep. 22, 2020

(54) COORDINATING ZERO TOUCH NETWORK JOINS

(71) Applicant: Cisco Technology, Inc., San Jose, CA (US)

(72) Inventors: Pascal Thubert, La Colle sur Loup (FR); Max Pritikin, Boulder, CO (US); Eliot Lear, Wetzikon (CH); Toerless Eckert, Mountain View, CA (US); Nancy Cam-Winget, Mountain View, CA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 15/383,442

(22) Filed: Dec. 19, 2016

(51) Int. Cl.
  *H04W 76/10* (2018.01)
  *H04W 40/24* (2009.01)
  *H04L 29/08* (2006.01)

(52) U.S. Cl.
  CPC .......... *H04W 76/10* (2018.02); *H04L 67/10* (2013.01); *H04W 40/244* (2013.01)

(58) Field of Classification Search
  None
  See application file for complete search history.

(56) References Cited

U.S. PATENT DOCUMENTS

| | | | |
|---|---|---|---|
| 7,333,464 B2 | 2/2008 | Yang et al. | |
| 9,130,837 B2 | 9/2015 | Bjarnason et al. | |
| 9,408,133 B2 | 8/2016 | Turon et al. | |
| 2012/0151561 A1* | 6/2012 | Kreiner | H04L 12/1845 726/4 |
| 2012/0324119 A1* | 12/2012 | Imes | H04L 12/2818 709/227 |
| 2015/0363704 A1 | 12/2015 | Yong et al. | |
| 2015/0372875 A1* | 12/2015 | Turon | H04L 63/10 370/254 |

(Continued)

OTHER PUBLICATIONS

Pritikin et al., Feb. 13, 2015, "Bootstrapping Key Infrastructures draft-pritikin-anima-bootstrapping-keyinfra-01", pp. 1-23.*

(Continued)

*Primary Examiner* — Adnan Baig
(74) *Attorney, Agent, or Firm* — Behmke Innovation Group LLC; Kenneth J. Heywood; James J. Wong

(57) ABSTRACT

In one embodiment, a device in a network receives node information regarding a plurality of nodes that are to join the network. The device determines network formation parameters based on the received node information. The network formation parameters are indicative of a network join schedule and join location for a particular node from the plurality of nodes. The device generates, according to the network join schedule, a join invitation for the particular node based on the network formation parameters. The join invitation allows the particular node to attempt joining the network at the join location via a specified access point. The device causes the sending of one or more beacons via the network that include the join invitation to the particular node. The particular node attempts to join the network via the specified access point based on the one or more beacons.

18 Claims, 14 Drawing Sheets

(56) References Cited

U.S. PATENT DOCUMENTS

2016/0014693 A1     1/2016   Patil et al.
2016/0112367 A1     4/2016   Thubert et al.

OTHER PUBLICATIONS

Pritikin et al., "Bootstrapping Remote Secure Key Infrastructures (BRSKI)", ANIMA WG Internet-Draft, <draft-ietf-anima-bootstrapping-keyinfra-03>, Jun. 30, 2016, 46 pages, Internet Engineering Task Force Trust.

Tarkoma et al., "Theory and practice of bloom filters for distributed systems.", IEEE Communications Surveys & Tutorials, vol. 14, No. 1, pp. 131-155, First Quarter 2012, IEEE.

Westphal et al., "A Bloom Filter approach for scalable CCN-based discovery of missing physical objects", 2016 13th IEEE Annual Consumer Communications & Networking Conference (CCNC), Las Vegas, NV, 2016, pp. 954-959, IEEE.

Behringer et al. "An Autonomic Control Plane draft-ietf-anima-autonomic-control-plane-04" ANIMA WG; Internet-Draft; Intended status: Standards Track; Oct. 31, 2016; pp. 1-33.

Jo et al. "Distributed Service Discovery in Moblie IoT Environments Using Hierarchical Bloom Filters"; http://link.springer.com/chapter/10.1007%2F978-3-319-19890-3_32#page-1; 2015.

\* cited by examiner

US 10,785,809 B1

COORDINATING ZERO TOUCH NETWORK JOINS

TECHNICAL FIELD

The present disclosure relates generally to computer networks, and, more particularly, to coordinating zero touch network joins.

BACKGROUND

Mesh networks have become increasingly popular and practical in recent years. In particular, shared-media mesh networks, such as wireless networks, etc., are often on what is referred to as Low-Power and Lossy Networks (LLNs), which are a class of network in which both the routers and their interconnect are constrained. Notably, LLN routers typically operate with highly constrained resources (e.g., processing power, memory, power source, etc.), and communicate via links that are characterized by high loss rates, low data rates, and/or instability.

An example implementation of LLNs is an "Internet of Things" network. Loosely, the term "Internet of Things" or "IoT" may be used to refer to uniquely identifiable objects (things) and their virtual representations in a network-based architecture. In particular, the next frontier in the evolution of the Internet is the ability to connect more than just computers and communication devices, but rather the ability to connect "objects" in general, such as lights, appliances, vehicles, heating, ventilating, and air-conditioning (HVAC) devices, windows and window shades and blinds, doors, locks, etc. The "Internet of Things" thus generally refers to the interconnection of objects (e.g., smart objects), such as sensors and actuators, over a computer network, which may be the public Internet and/or a private network.

To join a device/node to a wireless network, many mechanisms require the joining node to have preconfigured knowledge about the network such as a default network identifier. However, using a default network identifier could also be a security concern, as it also makes the node susceptible to man-in-the-middle attacks. Another approach that has been developed is WiFi Protected Setup (WPS). This typically permits network admission through key sharing when a button is pushed on a home router. However, an unauthorized observer present at the time may also be permitted to join the network. In addition, pressing a button on an enterprise router is not scalable, as the router may not be located in an accessible place, nor operated by the person performing a replacement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
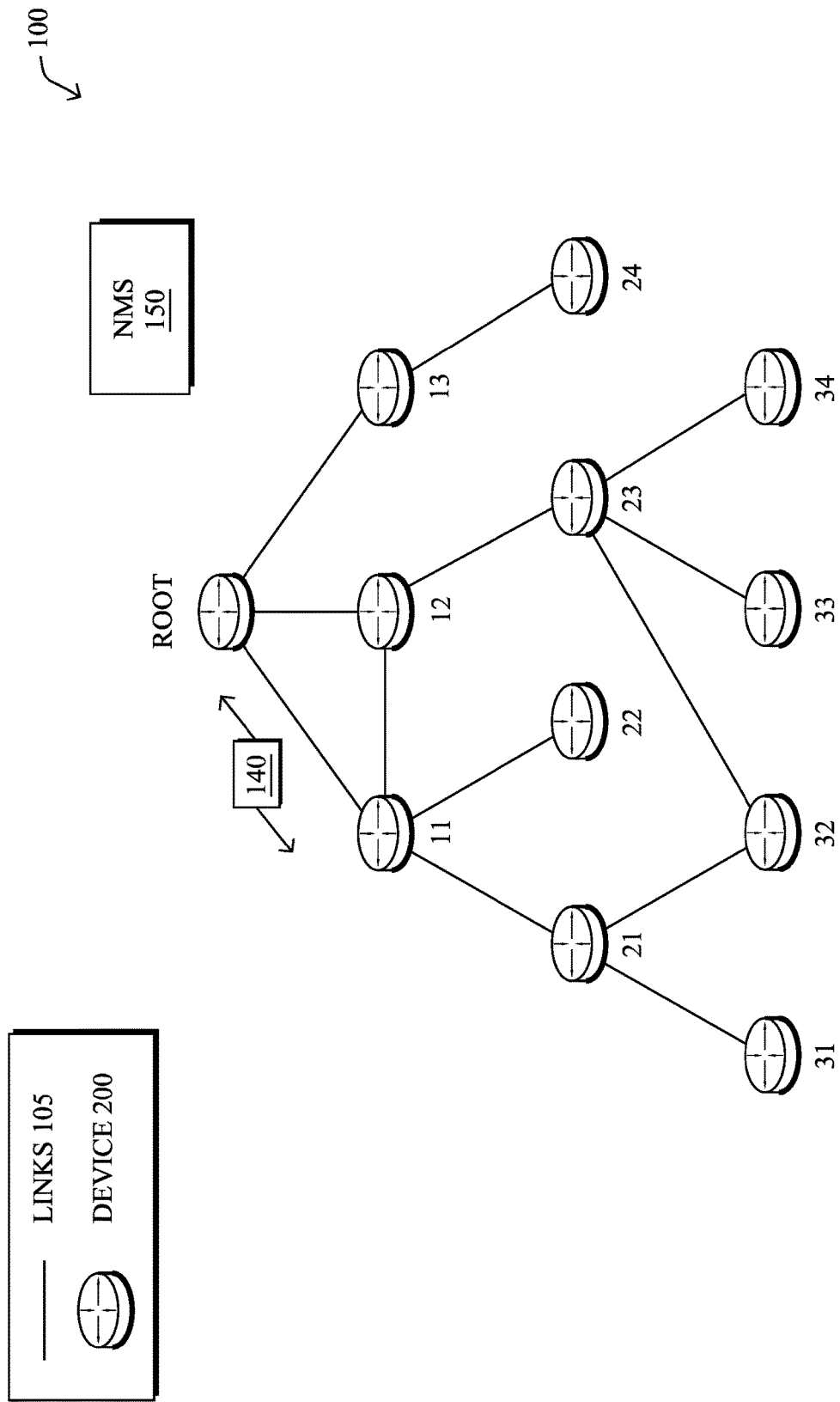
FIG. 1 illustrates an example communication network.

According to one or more embodiments of the disclosure, a device in a network receives node information regarding a plurality of nodes that are to join the network. The device determines network formation parameters based on the received node information. The network formation parameters are indicative of a network join schedule and join location for a particular node from the plurality of nodes. The device generates, according to the network join schedule, a join invitation for the particular node based on the network formation parameters. The join invitation allows the particular node to attempt joining the network at the join location via a specified access point. The device causes the sending of one or more beacons via the network that include the join invitation to the particular node. The particular node attempts to join the network via the specified access point based on the one or more beacons.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management system (NMS), a dynamic host configuration protocol (DHCP) server, a constrained application protocol (CoAP) server, an outage management system (OMS), etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
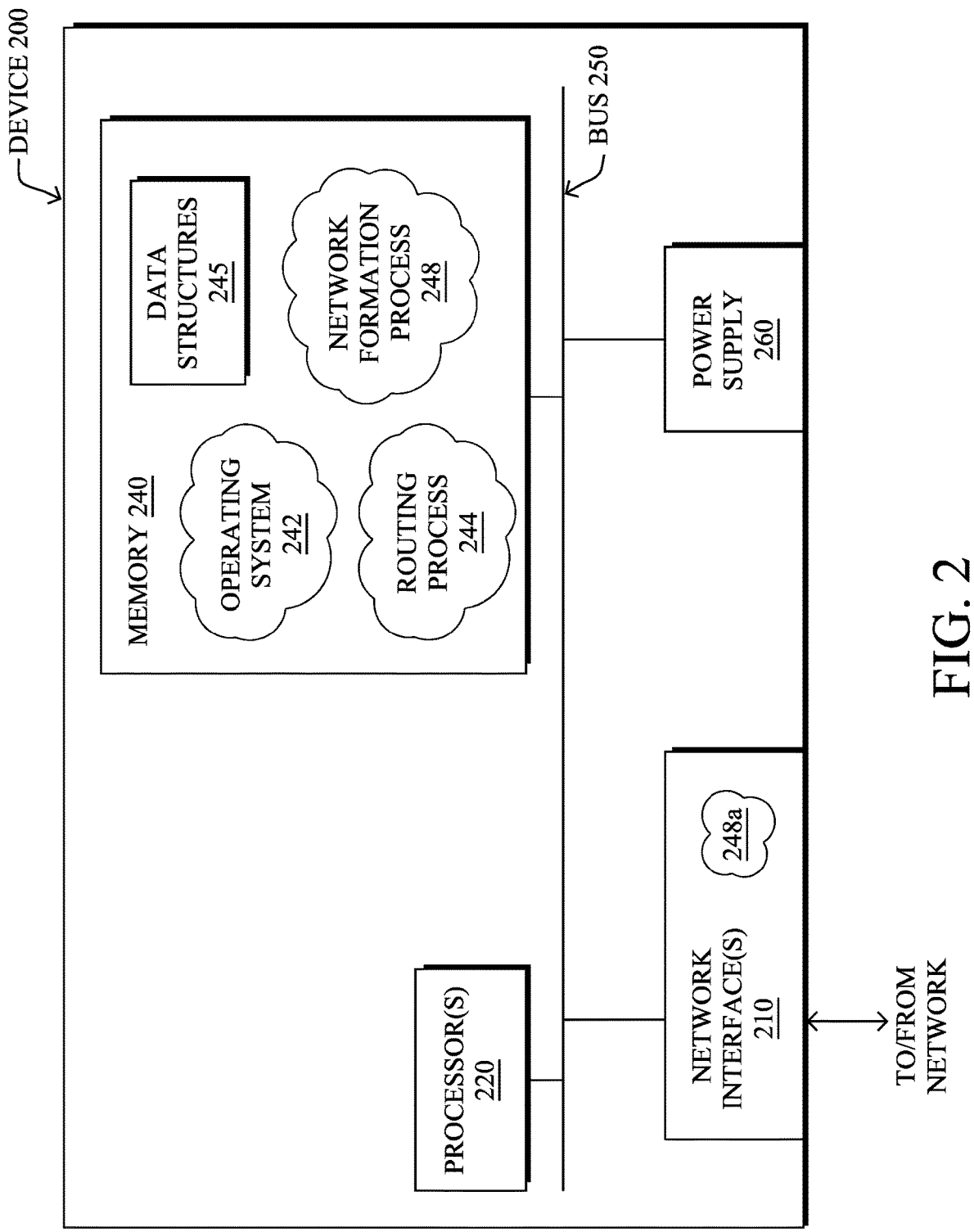
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 and an illustrative network formation process 248, as described herein. Note that while process 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 includes computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are included in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
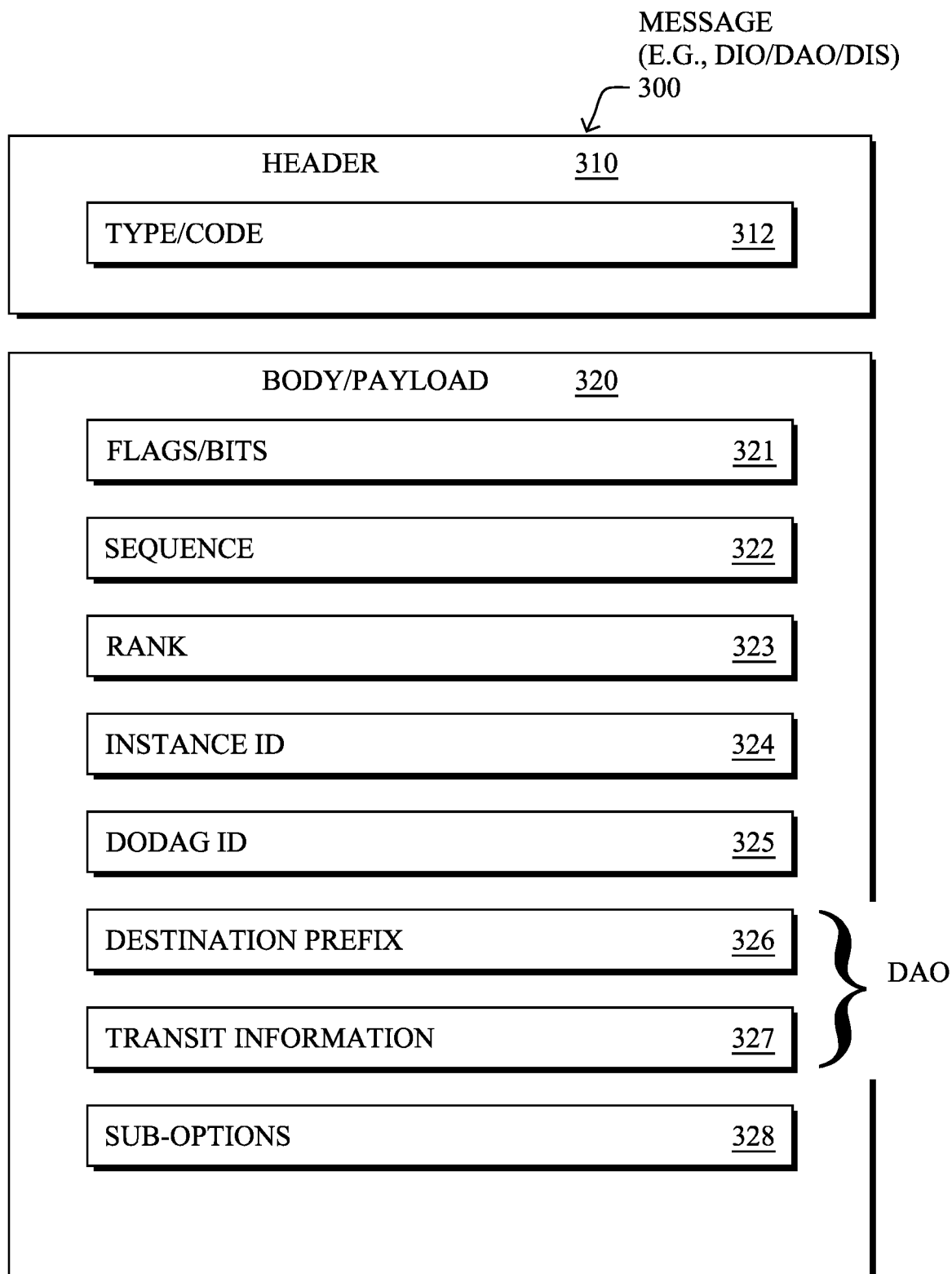
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
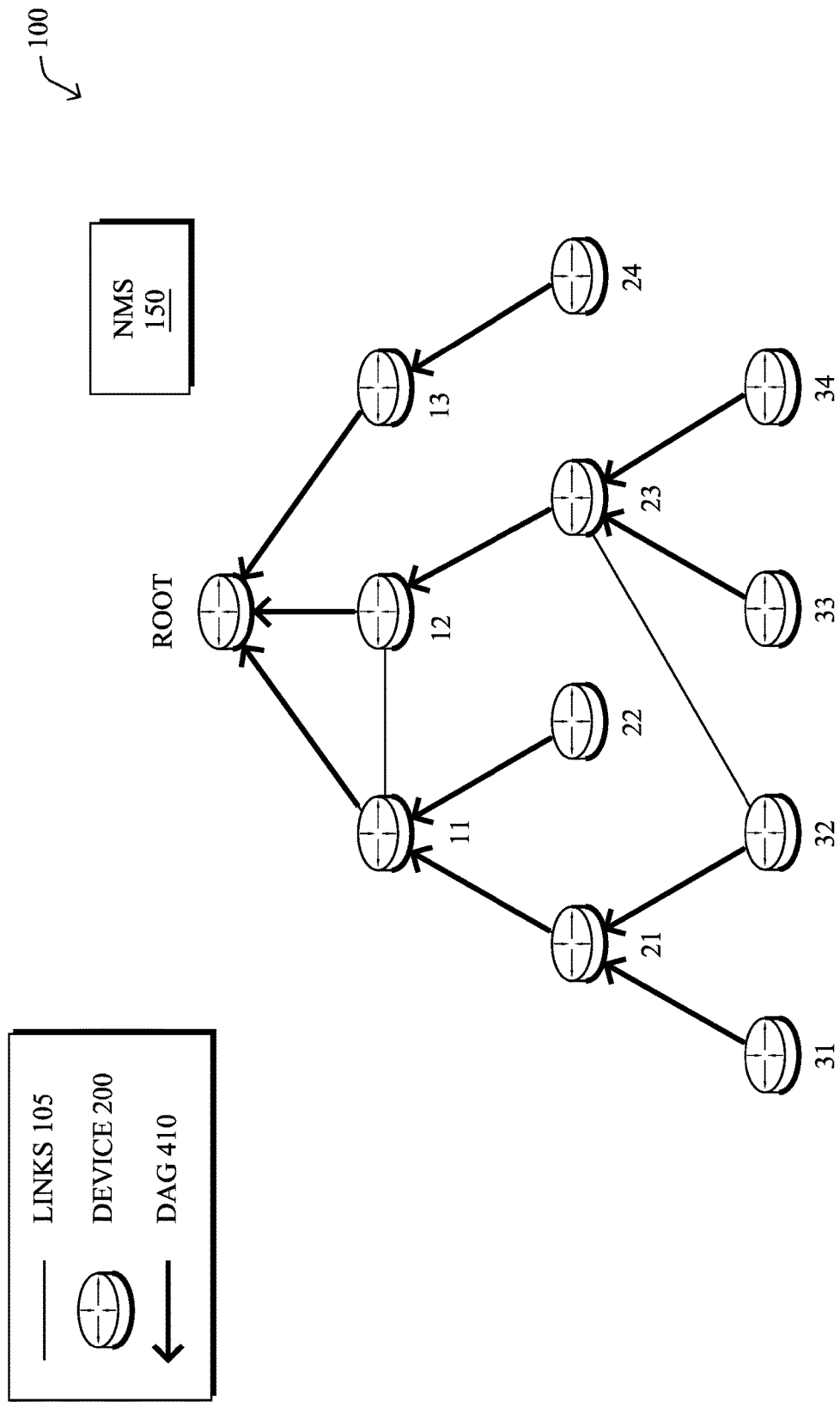
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

While routing protocols such as RPL are able to efficiently form a routing topology for nodes in a network, there still needs to be a mechanism in place to allow nodes to join the network both initially at network formation and to add new nodes to a preexisting network. As noted above, however, many wireless "things" in an IoT network are unable to automatically configure themselves for wireless connectivity, leading to potential man-in-the-middle attacks. Notably, many network discovery and bootstrapping mechanisms assume that the wireless device has some pre-configured default knowledge of the network to join (e.g., a default network identifier) and that the network infrastructure also advertises this information. While joining traditional devices (e.g., cell phones, computers, etc.) to a non-defaulted wireless network is relatively straightforward, many nodes/devices in the IoT will not have user interfaces, making it impractical to configure each and every node/device that needs to join the network. Additionally, the network infrastructure would need to be specially configured for each type of joining node/device/thing.

In addition, current network discovery and bootstrapping mechanisms typically involve the to-be-bootstrapped device iterating through discovered infrastructures in search of one where bootstrapping runs to secure completion. While flexible, this can result in a number of extra round trips and cryptographic operations during bootstrapping. This can be particularly problematic for devices running on LLNs such as 802.15.4 networks (e.g., 6TiSCH, etc.).

Coordinating Zero Touch Network Joins

The techniques herein allow a node to identify which network to join without requiring the node to have been preconfigured with a default identifier for the network and without requiring a manual configuration step. For example, in the case of IEEE 802.15.4 wireless networks, the techniques herein allow the node to identify the personal area network (PAN) to join. In another example, in the case of IEEE 802.11 wireless networks, the techniques herein allow the node to identify the Services Set Identifier (SSID) of the network, to communicate with a wireless base station. In some aspects, the network may leverage a Bloom filter or similar join invitation mechanism, to uniquely identify the node(s) that are allowed to join the network.

Specifically, according to one or more embodiments of the disclosure as described in detail below, a device in a network receives node information regarding a plurality of nodes that are to join the network. The device determines network formation parameters based on the received node information. The network formation parameters are indicative of a network join schedule and join location for a particular node from the plurality of nodes. The device generates, according to the network join schedule, a join invitation for the particular node based on the network formation parameters. The join invitation allows the particular node to attempt joining the network at the join location via a specified access point. The device causes the sending of one or more beacons via the network that include the join invitation to the particular node. The particular node attempts to join the network via the specified access point based on the one or more beacons.

Illustratively, the techniques described herein may be performed by hardware, software, and/or firmware, such as in accordance with the network formation process 248, which may include computer executable instructions executed by the processor 220 (or independent processor of interfaces 210) to perform functions relating to the techniques described herein, e.g., in conjunction with routing process 244.

Operationally, certain aspects of the techniques herein introduce a "pull model" whereby wireless access points (APs) and/or full-function devices (FFDs) pull selected nodes/devices into the network. In some embodiments, beacons may convey join invitations to the selected node(s) thereby allowing the network to control when and where a particular node is to join the network. For example, a beacon may include a Bloom filter that encodes identifiers for the node(s) that are currently allowed to join the network via the broadcasting device (e.g., the AP, FFD, etc.).

FIGS. 5A-5G illustrate examples of the coordination of nodes joining the network, according to various embodiments. In the example shown in FIG. 5A, assume that the Root device is in communication with an NMS 150 and node 11, which may be a wireless switch, AP, FFD, or any other wireless device via which other nodes may join the network. Assume also that nodes are also able to join the network via the Root device itself.

As would be appreciated, the network configuration shown is illustrative only and that the techniques herein can be used in conjunction with any number of different network protocols and configurations. For example, in the case of 802.15.4 networks, the network may be of a star formation whereby all nodes connect to a designated PAN coordinator (e.g., a designated FFD) or, alternatively, of a peer-to-peer formation whereby nodes can link to other nearby nodes to form any number of different connection patterns. Similarly, in the case of 802.11 networks, the network may include any number of wireless access points that can be deployed and connected as desired.

In various embodiments, NMS 150 may receive node information regarding the potential nodes to join the network, such as node identifiers that uniquely identify the specific nodes and/or their types. In some cases, this may entail receiving scanned codes from the various nodes, such as scanned quick response (QR) code information, bar codes, or the like. In other cases, NMS 150 may receive the node information from one or more remote servers associated with the device manufacturer or vendor. For example, when a given node is sold, its identification information may be sent to NMS 150. In one embodiment, the node identifier may correspond to the contents of the subject field found in the nodes' IEEE 802.1AR IDevID, which uniquely identifies the node.

Based on the received node information (e.g., regarding nodes 12-34), NMS 150 or another supervisory device in network 100 may determine a network join strategy for nodes 12-34 that comprises temporal and/or locational join parameters for each of the nodes. Notably, network formation in many sensor networks can take on the magnitude of hours for each node to join the network. In some embodiments, NMS 150 or other supervisory device may determine a join schedule for each of nodes 12-34 that are to join network 100. In other words, certain nodes may be allowed to join network 100 before others. Various factors that may affect when a given node is allowed to join network 100 may include, but are not limited to, the device type of the node (e.g., the function of the node, etc.), the expected physical location of the node in relation to other nodes (e.g., to allow other nodes to join the network first), the types of traffic expected from the node (e.g., to reduce network overhead during network formation, etc.), and the like.

In further embodiments, NMS 150 or other supervisory device may also determine a join location for each of nodes 12-34. For example, each of nodes 12-34 may be allowed to join network 100 via a specified AP/wireless switch/etc. Doing so also allows the supervisory device to control the layout of the network. Example factors that may influence where a particular node attempts to join the network may include, but are not limited to, the expected physical location of the network, the expected traffic through the selected AP/wireless switch/etc., the device type of the node, and the like.

The supervisory device in charge of overseeing the formation of network 100 may control the join schedules and join locations for the various joining nodes in a number of ways. In some cases, the device may employ any number of templates or rules, to control the network joins. For example, a certain type of sensor network layout may be templatized and used by the supervisory device to control when and where each of nodes 12-34 join network 100. In further cases, the device may receive input from a user interface (e.g., from a network administrator) that is used to control when and where each node joins the network.

As noted previously, one key aspect of the techniques herein is a mechanism whereby nodes are selectively "pulled" into the network. To control when and where a particular node is pulled into the network, the NMS or other supervisory device may generate a join invitation for the node that is then sent to the corresponding join location. In some embodiments, the join invitation may comprise a Bloom filter that encodes the identities of the nodes currently allowed to join the network. For example, one Bloom filter may encode up to 100 node identities, based on the received node information about these nodes. If there are more than 100 identities, the NMS or other supervisory device may also generate multiple Bloom filters, as needed, and in accordance with the determined join schedules.

Figure 5A:
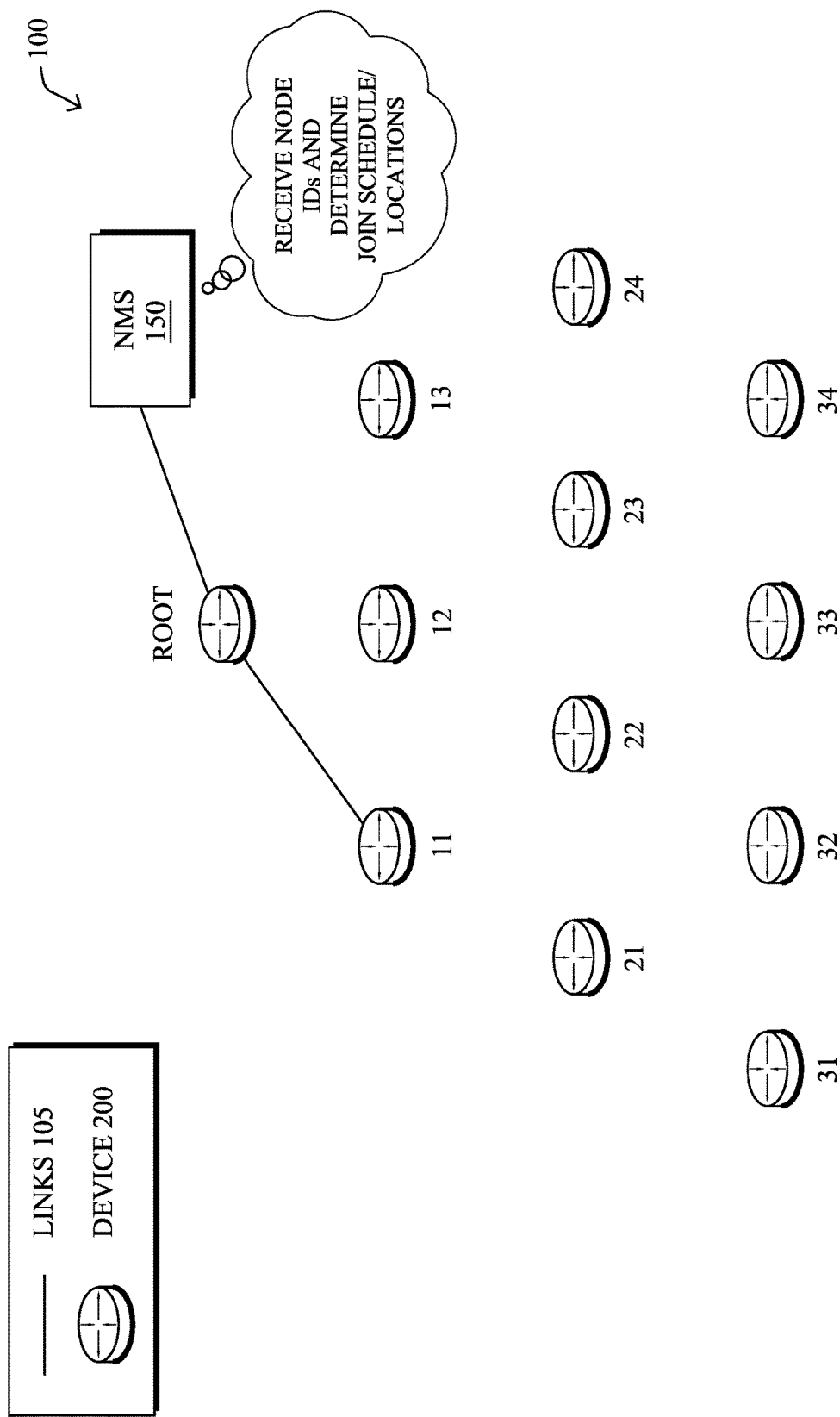
FIGS. 5A-5G illustrate examples of the coordination of nodes joining the network.
Figure 5B:
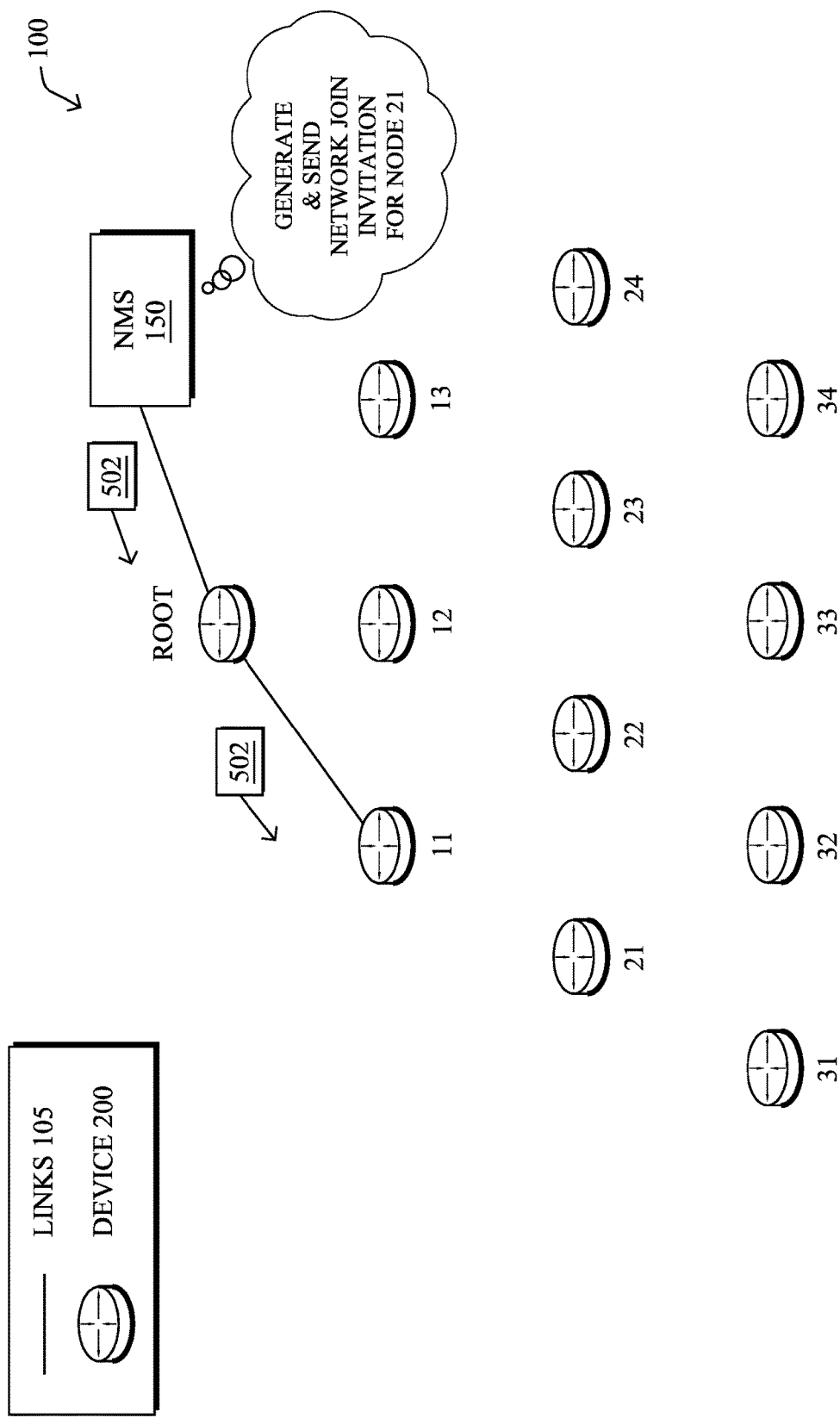

After generating the join invitation, the device may provide the invitation to the appropriate APs/wireless switches. For example, as shown in FIG. 5B, assume that NMS 150 determines that node 21 is ready to join network 100 via wireless AP node 11. In such a case, NMS 150 may generate a join invitation (e.g., a Bloom filter) that encodes the unique identifier for node 21 (and potentially any other joining nodes, as well) and send the invitation to node 11 via message 502. In some embodiments, message 502 may also include the individual PSK preset by the vendors/manufacturers, which could be passed to the AP along with the list of nodes allowed to join the network at this time.

Figure 5C:
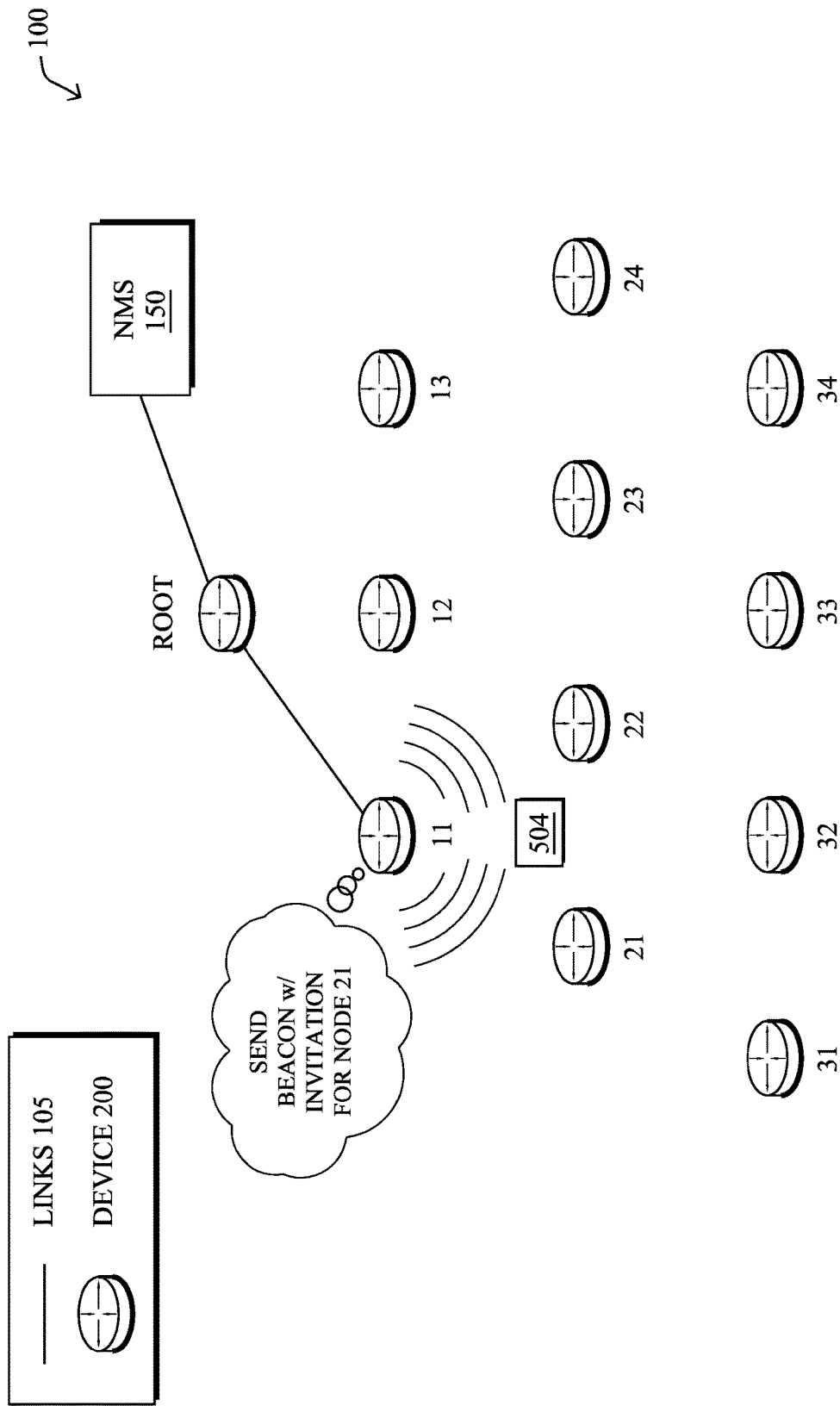

In turn, any wireless APs/FFDs/etc. that receive a join invitation message from NMS 150 may include the join invitation in wireless beacons and using a round robin, as required. For example, as shown in FIG. 5C, AP node 11 may include the Bloom filter from message 502 in beacons 504 that are broadcast by node 11. In the case of IEEE 802.11 networks, an AP may use IEEE 802.1aq beacons. A similar mechanism may be used in IEEE 802.15.4 networks, such as by including the Bloom filter(s) or other join invitations in information elements (IEs). Optionally, a beacon may also include a Manufacturer Usage Description (MUD) URL. If such cases, the NMS may include the corresponding subject in the Bloom filter if there is reason to believe the device can support the node (e.g., if it is configured to do so for that MUD URL).

Figure 5D:
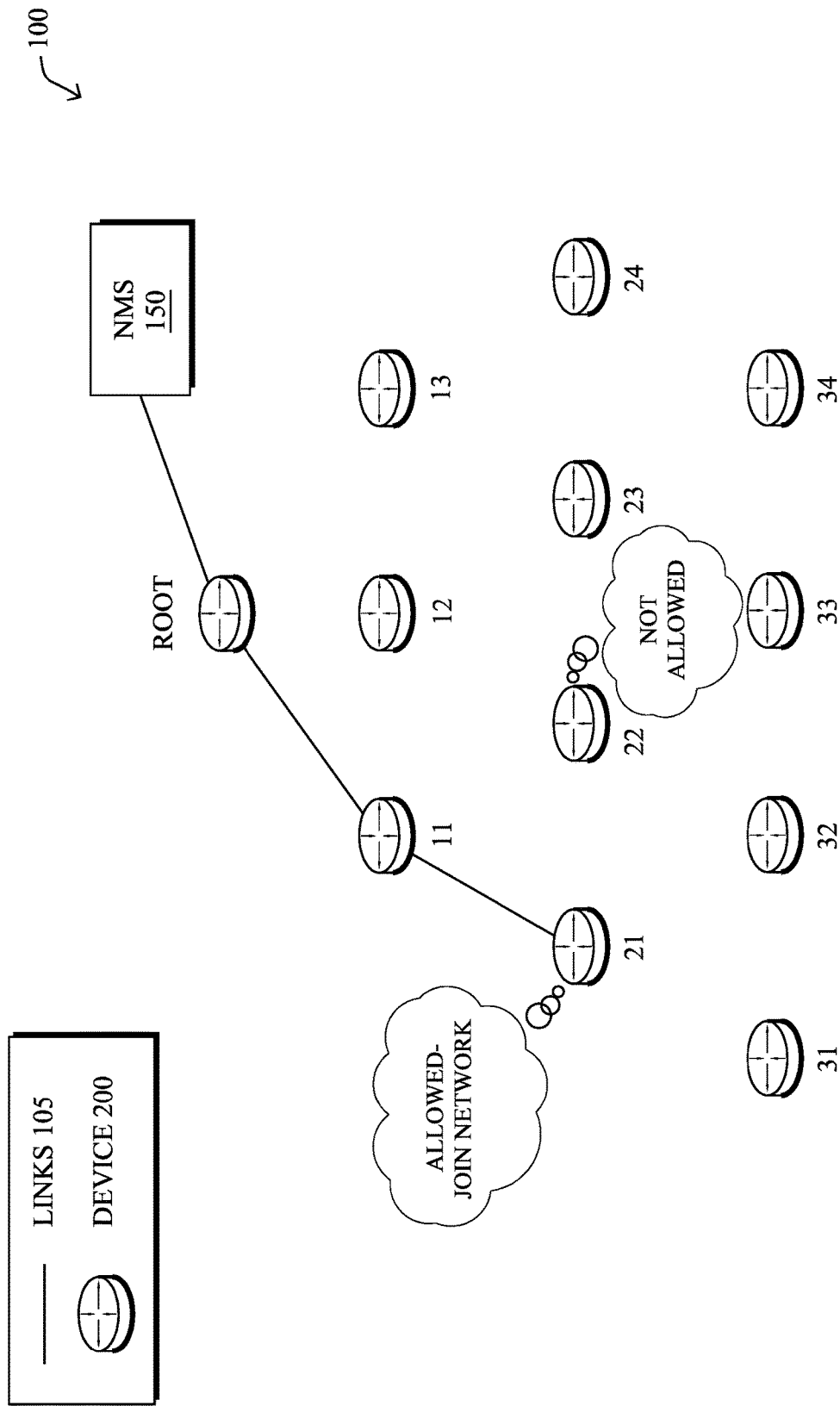

In various embodiments, nodes that are to join the network may stay in a listening mode until a beacon is received. For example, as shown in FIG. 5D, assume that both of nodes 21 and 22 receive a beacon 504 sent by AP node 11. In response, nodes 21-22 may determine whether the join invitation is applicable to the receiving node. For example, in the case of a Bloom filter, nodes 21-22 may each check whether any of the hashes in the Bloom filter represent the identifier of the node (e.g., its IEEE 802.1AR IDevID subject field, etc.), to determine whether the node should join the network. If no match is found, the node may continue to listen for beacons and remain in the listen state until it successfully receives a beacon that includes its identity information. For example, based on the join invitation in beacon 504, node 21 may determine that it is allowed to attempt to join network 100 via AP node 11 and do so, accordingly.

Node 22, in contrast, may determine that it is not allowed to attempt to join network 100 at this time and continue to remain in its listening mode. In some cases, a matching Bloom filter may be used to prioritize and optimize network joins, but may not prevent any given nodes from joining other networks. For example, while node 22 is not currently allowed to join network 100, it may still be free to join other networks. Furthermore, as discussed below, because Bloom filters are probabilistic in nature, it is possible that a node may attempt to join a network for which it is not allowed.

To establish connectivity to network 100, node 21 may perform the steps necessary, which may depend on the type of network. For example, in the case of an IEEE 802.11 network, node 21 may use IEEE 802.11u frames to establish connectivity. In some embodiments, a joining node may also use Autonomic Networking Integrated Model and Approach (ANIMA) bootstrapping to join the network, as detailed in the IETF draft, entitled "Bootstrapping Remote Secure Key Infrastructures (BRSKI)," by Pritikin et al. Generally, ANIMA bootstrapping provides a security mechanism whereby security certificates are used to authenticate and/or authorize the node that is to join the network. Thus, while the beacon may invite a node to attempt joining the network, ANIMA bootstrapping provides another layer of security to ensure that the joining node is indeed authorized to enroll in the network.

If ANIMA enrollment succeeds, the node may then proceed to complete is joining to the 802.11 network with its new local network operational credentials using IEEE 802.11i with EAP-TLS. If enrollment does not succeed, the node may instead return to its listening state in anticipation of other beacons, assuming that a hash collision has occurred. The node will only retry the same network if a different Bloom filter or other beacon invitation is received that also matches the node's identifier, and only periodically. However, if enrollment does succeed, node 21 may cease listening for beacons once it has joined network 100, after which it no longer requires new network access.

Figure 5E:
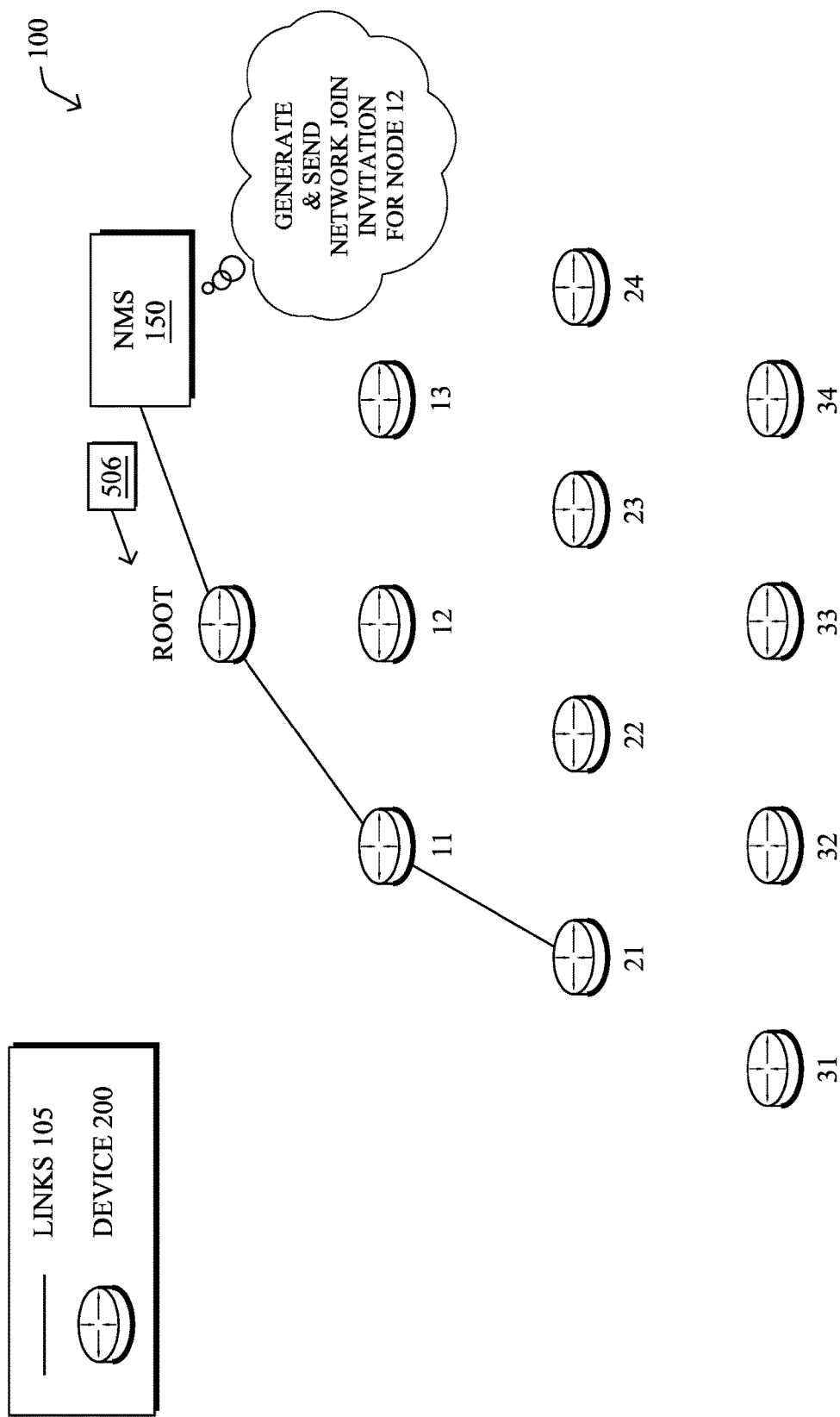

Once a node has successfully authenticated and joined the network, the NMS or other supervisory device may remove the node's identifier from the join invitation sent via the beacons (e.g., from a Bloom filter). For example, as shown in FIG. 5E, assume that node 21 has successfully joined network 100 via AP node 11. Also, assume that NMS 150 determines at a subsequent point in time that node 12 is now allowed to join network 100 via the Root. In such a case, NMS 150 may generate a new Bloom filter that no longer includes the identifier for node 21 (since it has already joined network 100) and now includes the identifier for node 12. In turn, NMS 150 may send the new Bloom filter to the Root via a message 506.

Figure 5F:
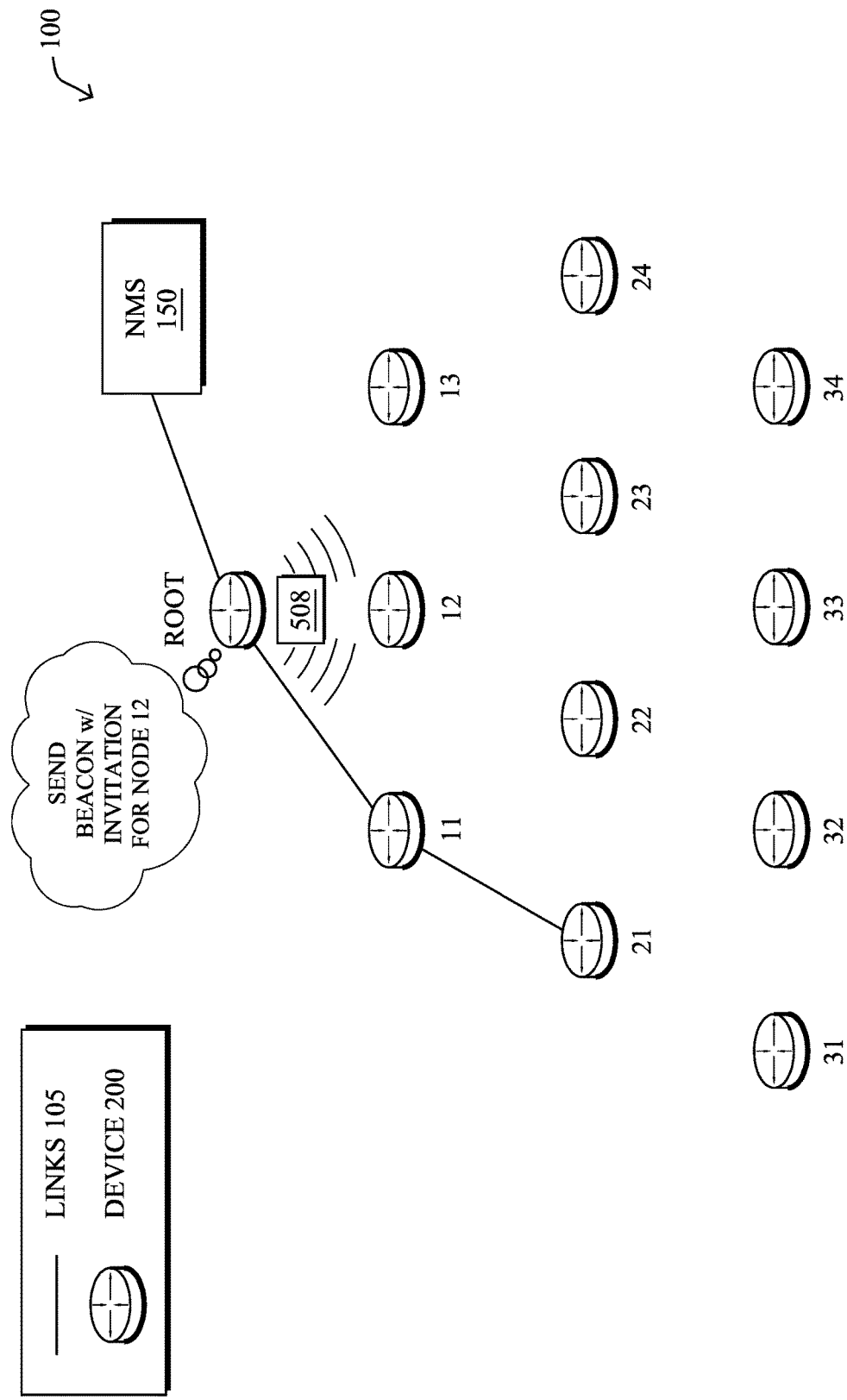
Figure 5G:
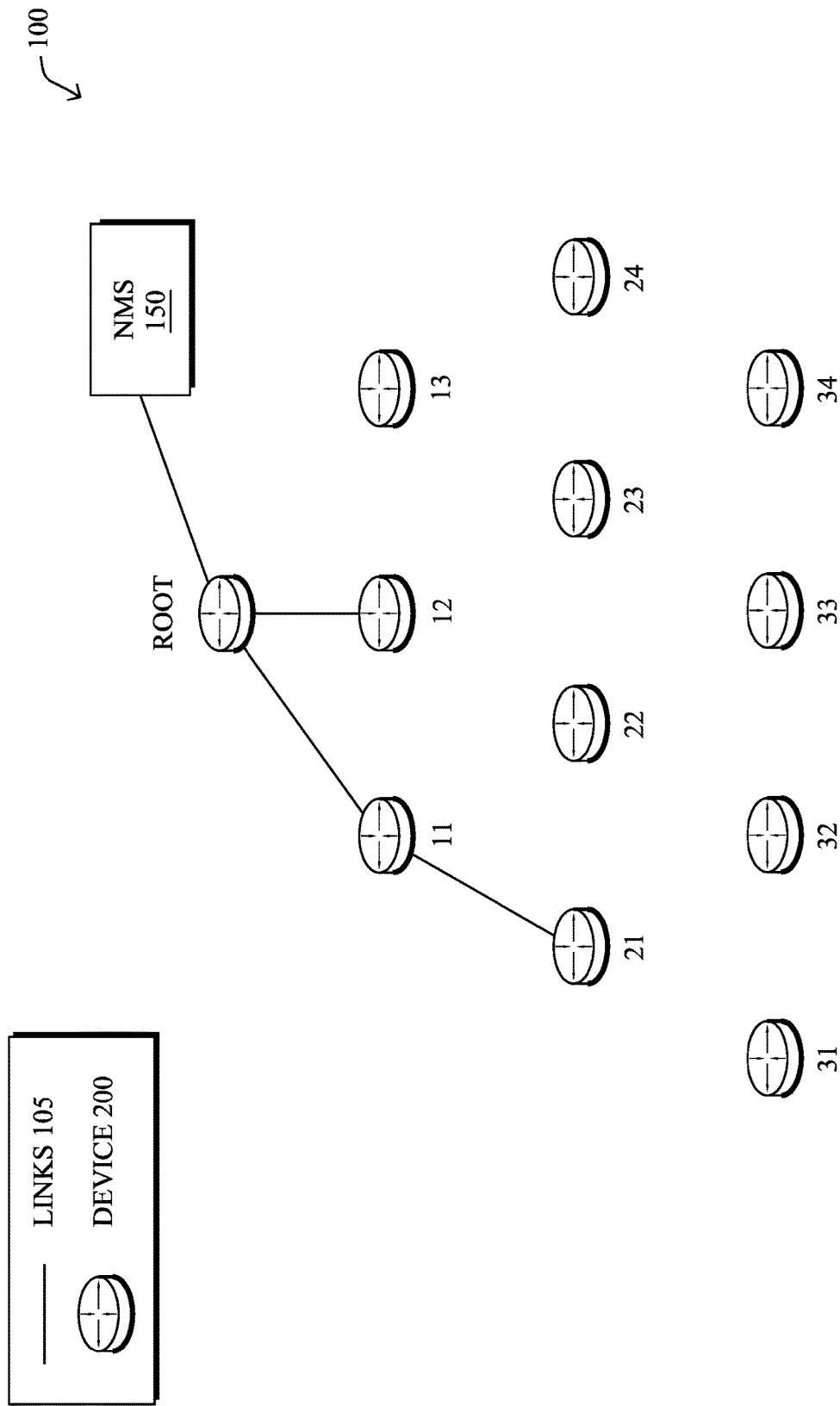

Based on the join invitation information in message 506, the Root device may include this information (e.g., the Bloom filter) in one or more beacons 508, as shown in FIG. 5F. In turn, as shown in FIG. 5G, node 12 may compare its identifier to that indicated by beacon 508, to determine whether it should join network 100 via the Root. When a match is found, node 12 may then proceed to join network 100 by taking the appropriate steps, similar to those taken by 21.

Thus, NMS 150 or other supervisory device in network 100 is aware of the list of expected identities for the nodes that are to join network 100, but this list is never actually broadcast from the network. Instead, only selected identities may be sent via the beacons and using a mechanism such as a Bloom filter. Consequently, the network can detect malicious attempts to join the network (e.g., by potential attackers) based on the Bloom filter. Further, the NMS is able to coordinate when and where nodes join the network using the techniques herein, thereby enabling a faster and more efficient network formation process.

Figure 6A:
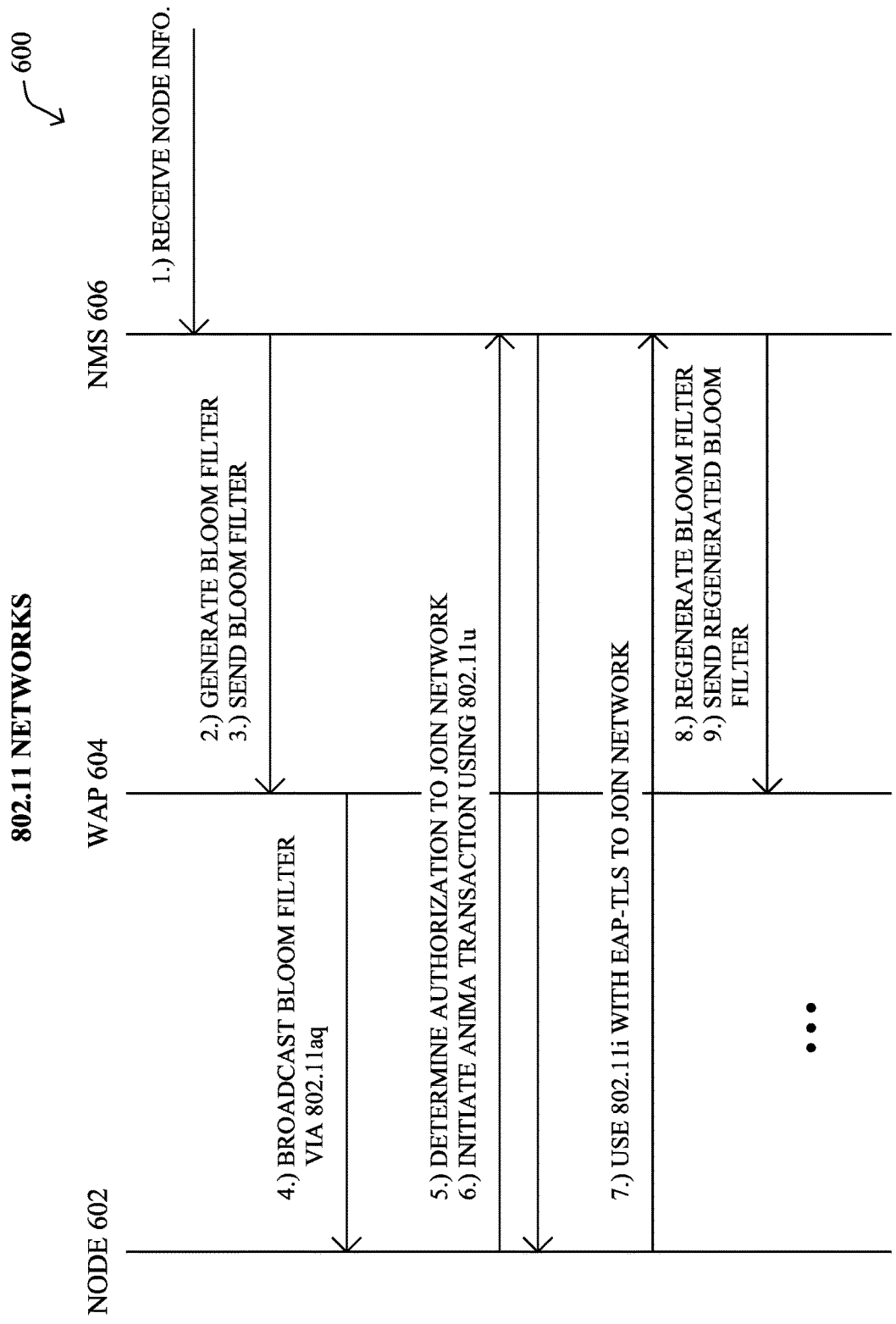
FIGS. 6A-6B illustrate example sequence diagrams of the coordination of network joins using different wireless protocols.
Figure 6B:
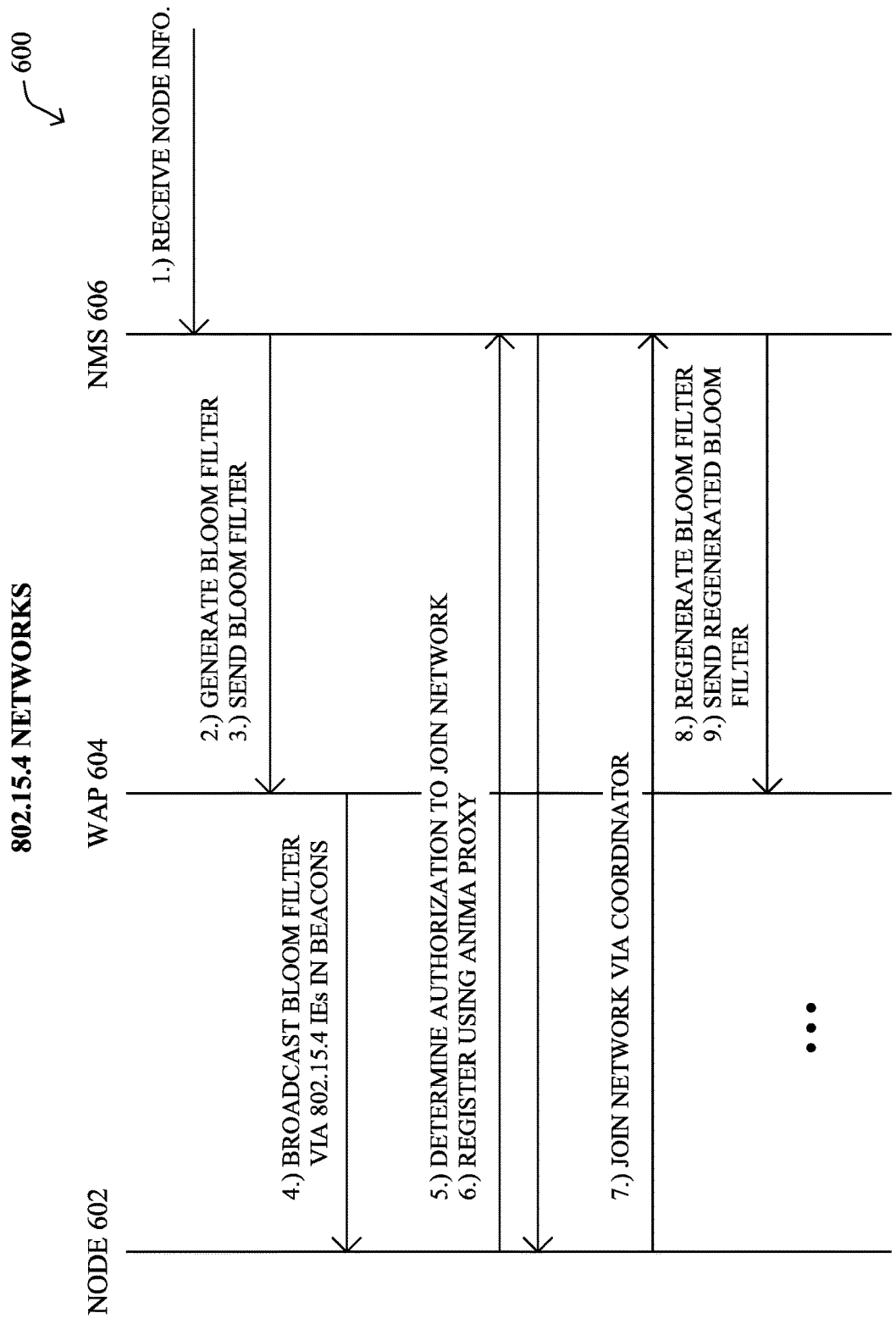

FIGS. 6A-6B illustrate example sequence diagrams of the coordination of network joins using different wireless protocols, according to various embodiments. More specifically, FIG. 6A illustrates a sequence diagram 600 to apply the techniques herein to an IEEE 802.11 wireless network and FIG. 6B illustrates a sequence diagram 610 to apply the techniques herein to an 802.15.4 network. As would be appreciated, the illustrated network protocols are exemplary only and the techniques herein can be adapted for use in other types of wireless networks, as well.

In FIG. 6A, sequence diagram 600 starts off with NMS 606 receiving node information regarding the node(s) that are to join the network. This node information may include, for example, unique identifiers for the node(s), such as a node 602 that is to join the network. In turn, NMS 606 may determine when and where node 602 is to join the network. For example, NMS 606 may determine that node 602 is to join the network via wireless AP (WAP) 604 after a certain time. Based on this determination, NMS 606 may encode the identifier for node 602 into a Bloom filter and send the Bloom filter to WAP 604. To "pull" node 602 into the network, WAP 604 may include the received Bloom filter in one or more broadcasted 802.11aq beacons.

In response to receiving the beacon from WAP 604, node 602 may determine whether it is allowed to attempt joining the network by comparing its own identifier to that of the Bloom filter in the beacon. If so, node 602 may initiate an ANIMA transaction using 802.11u communications. If successful, node 602 may then complete the network join using 802.11i communications with Extensible Authentication Protocol-Transport Layer Security (EAP-TLS). Note that with the use of Bloom filters, there is always the possibility of a false positive, leading a given node to believe that it matches an invitation when it does not (e.g., because the bits of the filter are actually coming from a set of other called nodes). In such cases, the WAP may also validate any false positives and, if a false positive is detected, issue a response instruction to the node to wait for the next latching call (e.g., the next round of join invitations).

Once node 602 has joined the network, NMS 606 may regenerate the Bloom filter to remove the identifier for node 602 and/or to add any newly allowed nodes that are to join the network via WAP 604. In turn, NMS 606 may then send the newly generated Bloom filter to WAP 604, to "pull" further nodes into the network. This process may continue as needed, until the network has been fully formed.

In FIG. 6B, sequence diagram 610 illustrates the steps to implement the techniques herein within an 802.15.4 network. As shown, the initial steps in sequence diagram 610 may be similar to those taken in FIG. 6A. Notably, NMS 606 may still receive node information regarding the nodes to join the network and generate and send a corresponding Bloom filter to WAP 604, to "pull" node 602 into the network. In the case of 802.15.4, WAP 606 may include the Bloom filter within IEs of 802.15.4 beacons. In turn, node 602 may compare its identifier to that indicated by the Bloom filter and attempt to register with an ANIMA proxy in the network. If successful, node 602 may then join the network after admission by the network coordinator (e.g., NMS 150, etc.). Finally, NMS 150 may take similar steps as those shown in FIG. 6A to generate and send an updated Bloom filter to WAP 604 to pull further nodes into the network.

Figure 7:
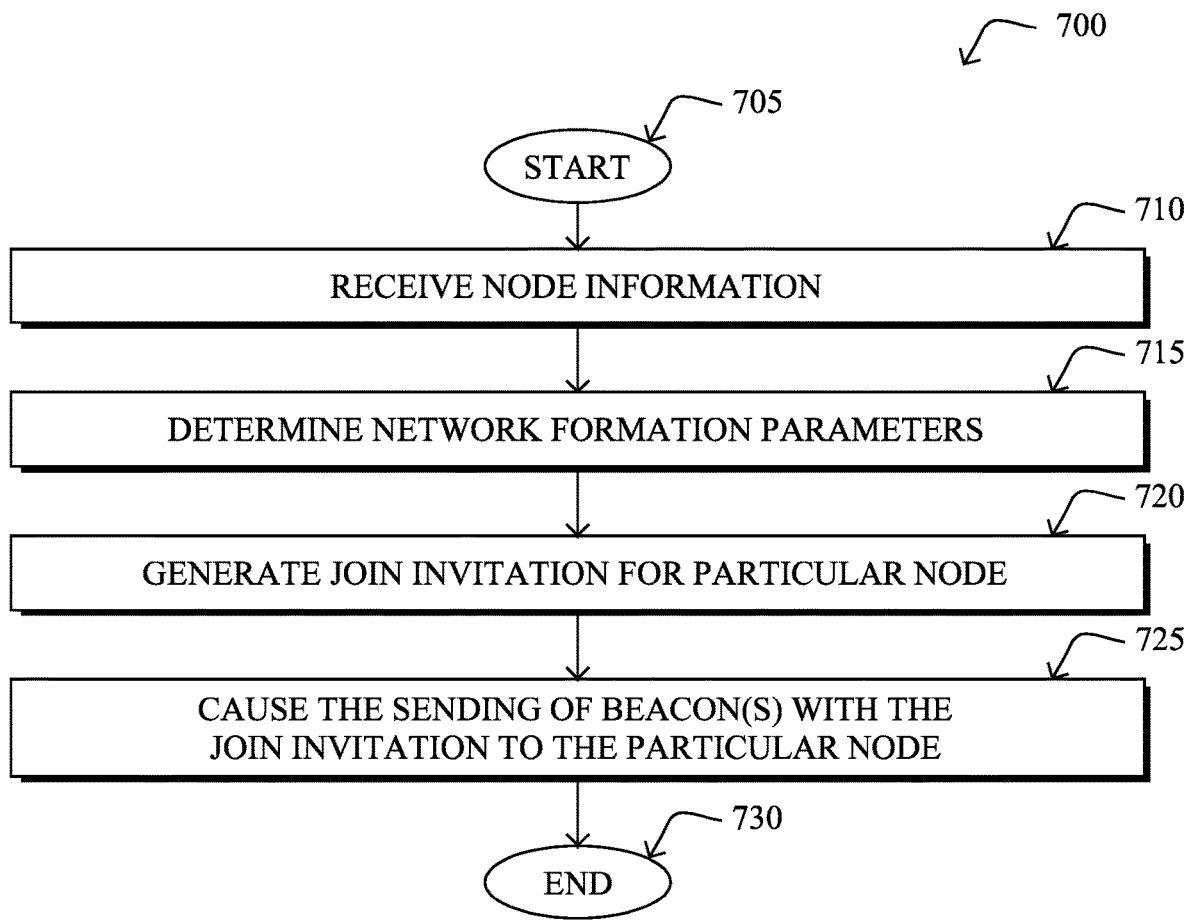
FIG. 7 illustrates an example simplified procedure for coordinating zero touch network joins in a network.

FIG. 7 illustrates an example simplified procedure for coordinating zero touch network joins in a network, according to various embodiments. Generally, procedure 700 may be performed by a non-generic, specifically configured device (e.g., device 200) executing stored instructions (e.g., process 248). For example, in some cases, the device may be an NMS or other supervisory device in the network. The procedure 700 may start at step 705, and continues to step 710, where, as described in greater detail above, the device may receive node information regarding a plurality of nodes that are to join the network. Such node information may include identifiers for the various nodes. For example, the device may receive the identifiers via scanned barcodes or QR codes on the nodes, from the manufacturer(s) or vendor(s) of the nodes, or the like. As a result, the device may have list of the nodes that will be joining the network.

At step 715, as detailed above, the device may determine network formation parameters for the network based on the received node information. In various embodiments, the network formation parameters are indicative of a network join schedule and join location for a particular node from the plurality of nodes. In other words, the device may determine when and where a joining node is to join the network (e.g., via a particular AP, etc.). In doing so, the device may control the network formation process to throttle when nodes join the network (e.g., to reduce overhead or congestion, etc.), to control the outlay of the network (e.g., by forcing certain nodes to use specified APs, etc.), and perform other functions.

At step 720, the device may generate a join invitation for the particular node, as described in greater detail above. In various embodiments, the invitation may allow the particular node to attempt joining the network, when received by the node. In some embodiments, the invitation may take the form of a Bloom filter that encodes the unique identifier of the particular node in the node information received in step 710.

At step 725, as detailed above, the device may cause the sending of one or more beacons via the network that include the join invitation to the particular node. For example, in the case in which the invitation takes the form of a Bloom filter, the device may send the Bloom filter to the specified access point that corresponds to the join location for inclusion in one or more beacons. In turn, the particular node may attempt to join the network via the specified access point based on the beacon(s). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the creation of a manifest of nodes that are to join a network and can be used to control when and where the nodes join the network. This allows each node to join the network without the need for manual configuration at each node. Further, the techniques herein free the network from having to advertise a default network identifier for services, as chosen by the device manufacturer, and for which the network administrator has no other use than for bootstrapping devices.

While there have been shown and described illustrative embodiments that provide for coordinating zero touch network joins, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as various wireless networking protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a device in a network, node information regarding a plurality of nodes that are to join the network, the node information received from a server associated with a manufacturer of each particular node of the plurality of nodes, wherein the node information includes information about each particular node that will be joining the network in the future so that the device expects each particular node prior to joining;

determining, by the device, network formation parameters based on the received node information, wherein the network formation parameters are indicative of a network join schedule and join location for a particular node that has not associated with the network from the plurality of nodes, wherein the join location is determined based on an expected physical location of the network, expected traffic through a specified access point, or a device type of the particular node;

generating, by the device and according to the network join schedule, a join invitation for the particular node based on the network formation parameters, wherein the join invitation allows the particular node to attempt joining the network at the join location via the specified access point; and causing, by the device, the sending of one or more beacons via the network that include the join invitation to the particular node, wherein the particular node attempts to join the network via the specified access point based on the one or more beacons.

2. The method as in claim 1, wherein the particular node uses Autonomic Networking Integrated Model and Approach (ANIMA) bootstrapping to join the network.

3. The method as in claim 1, wherein the node information comprises a scanned quick response (QR) code or barcode associated with the particular node.

4. The method as in claim 1, wherein the join invitation comprises a Bloom filter that identifies the particular node.

5. The method as in claim 4, wherein the Bloom filter identifies the particular node via a hash of a node identifier for the particular node in the received node information.

6. The method as in claim 1, further comprising:
making, by the device, a determination that the particular node has joined the network; and
causing, by the device, removal of the join invitation for the particular node from subsequent beacons sent via the network.

7. The method as in claim 1, wherein the network formation parameters are configured to stagger the joining of the network by at least a portion of the plurality of nodes, and wherein the device revokes the join invitation for the particular node after the particular node joins the network.

8. An apparatus, comprising:
one or more network interfaces to communicate with a network;
a processor coupled to the network interfaces and configured to execute one or more processes; and
a memory configured to store a process executable by the processor, the process when executed operable to:
receive node information regarding a plurality of nodes that are to join the network, the node information received from a server associated with a manufacturer of each particular node of the plurality of nodes, wherein the node information includes information about each particular node that will be joining the network in the future so that the device expects each particular node prior to joining;
determine network formation parameters based on the received node information, wherein the network formation parameters are indicative of a network join schedule and join location for a particular node that has not associated with the network from the plurality of nodes, wherein the join location is determined based on an expected physical location of the network, expected traffic through a specified access point, or a device type of the particular node;
generate, according to the network join schedule, a join invitation for the particular node based on the network formation parameters, wherein the join invitation allows the particular node to attempt joining the network at the join location via the specified access point; and
cause the sending of one or more beacons via the network that include the join invitation to the particular node, wherein the particular node attempts to join the network via the specified access point based on the one or more beacons.

9. The apparatus as in claim 8, wherein the particular node uses Autonomic Networking Integrated Model and Approach (ANIMA) bootstrapping to join the network.

10. The apparatus as in claim 8, wherein the node information comprises a scanned quick response (QR) code or barcode associated with the particular node.

11. The apparatus as in claim 8, wherein the join invitation comprises a Bloom filter that identifies the particular node.

12. The apparatus as in claim 11, wherein the Bloom filter identifies the particular node via a hash of a node identifier for the particular node in the received node information.

13. The apparatus as in claim 8, wherein the process when executed is further operable to:
make a determination that the particular node has joined the network; and
cause a removal of the join invitation for the particular node from subsequent beacons sent via the network.

14. The apparatus as in claim 8, wherein the network formation parameters are configured to stagger the joining of the network by at least a portion of the plurality of nodes, and wherein the device revokes the join invitation for the particular node after the particular node joins the network.

15. A tangible, non-transitory, computer-readable media having software encoded thereon, the software when executed by a device in a network operable to:
receive node information regarding a plurality of nodes that are to join the network, the node information received from a server associated with a manufacturer of each particular node of the plurality of nodes, wherein the node information includes information about each particular node that will be joining the network in the future so that the device expects each particular node prior to joining;
determine network formation parameters based on the received node information, wherein the network formation parameters are indicative of a network join schedule and join location for a particular node that has not associated with the network from the plurality of nodes, wherein the join location is determined based on an expected physical location of the network, expected traffic through a specified access point, or a device type of the particular node;
generate, according to the network join schedule, a join invitation for the particular node based on the network formation parameters, wherein the join invitation allows the particular node to attempt joining the network at the join location via the specified access point; and
cause the sending of one or more beacons via the network that include the join invitation to the particular node, wherein the particular node attempts to join the network via the specified access point based on the one or more beacons.

16. The computer-readable media as in claim 15, wherein the join invitation comprises a Bloom filter that identifies the particular node.

17. The computer-readable media as in claim 16, wherein the Bloom filter identifies the particular node via a hash of a node identifier for the particular node in the received node information.

18. The computer-readable media as in claim 15, wherein the network formation parameters are configured to stagger the joining of the network by the plurality of nodes.

* * * * *